(No Model.)
E. J. ARMSTRONG.
METALLIC PACKING FOR PISTON AND VALVE RODS.
No. 564,953. Patented July 28, 1896.
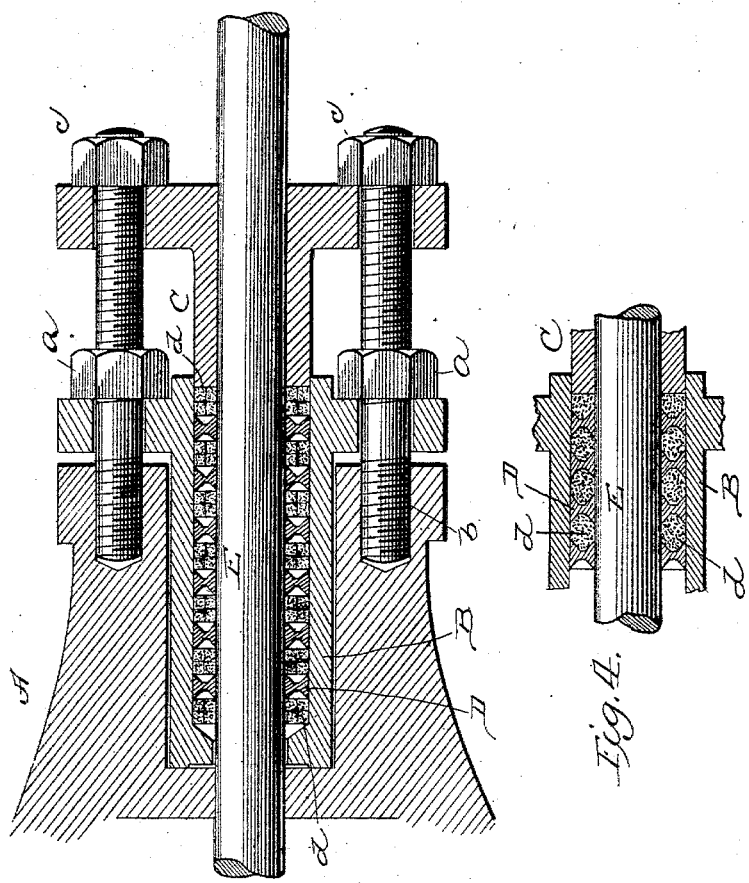
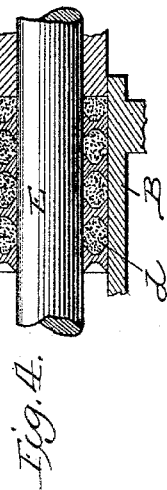
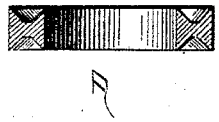
WITNESSES:
Henry S. Rohrer
Geo. M. Copenhaver
INVENTOR
Edwin J. Armstrong.
BY
W. A. Redmond
ATTORNEY.

UNITED STATES PATENT OFFICE.

EDWIN J. ARMSTRONG, OF OSWEGO, NEW YORK, ASSIGNOR TO AMES IRON WORKS, OF SAME PLACE.

METALLIC PACKING FOR PISTON AND VALVE RODS.

SPECIFICATION forming part of Letters Patent No. 564,953, dated July 28, 1896.

Application filed December 26, 1895. Serial No. 573,351. (No model.)

*To all whom it may concern:*

Be it known that I, EDWIN J. ARMSTRONG, a citizen of the United States, residing at Oswego, in the county of Oswego and State of New York, have invented certain new and useful Improvements in Metallic Packings for Piston and Valve Rods; and I do hereby declare the following to be a full, clear, and exact description of the invention, such as will enable others skilled in the art to which it appertains to make and use the same.

This invention relates to metallic packings for piston and valve rods of steam-engines, and it has for its object to provide a simple and durable device adapted to prevent leakage of steam; and it consists of a series of Babbitt metal or other similar soft antifriction metal rings of peculiar shape in cross-section in combination with a packing of suitable material interposed therebetween, whereby pressure exerted on said combined packing will cause the metal rings to be crushed against the interior cylindrical wall or surface of the box and against the rod passing therethrough, and in other details of construction and arrangements of parts, as will be hereinafter fully described and claimed.

In the accompanying drawings, forming a part of this specification, Figure 1 is a vertical longitudinal section through a stuffing-box, showing my invention; Fig. 2, a detail perspective view of one of the metal rings; Fig. 3, a vertical section through one of the rings, and Fig. 4 a detail sectional view showing the wire packing forced into the grooves of the rings.

Similar letters refer to similar parts throughout all the views.

In the drawings, A represents the stuffing-box of a steam-engine, and B a smaller stuffing or packing box arranged within the box A and secured in position by nuts $a$, run on studs $b$, projecting from the box A.

C represents a gland adjustably secured on the studs $b$ by means of nuts $c$, whereby the glands may be adjusted to take up wear, as desired.

A series of rings D, of Babbitt or other soft antifriction metal, are arranged within the box B with a suitable packing $d$, preferably fine brass wire braided, interposed therebetween and at each end, as clearly shown. The metal rings are cruciform in cross-section, and the wire or other packing interposed therebetween assume a polygonal form when in position, so as to completely fill up the space between the rings, as shown in Fig. 4, when the gland is tightened and causing the metal rings to be crushed both against the interior cylindrical surface of the box B and the rod E, passing therethrough and thereby prevent the passage of steam, while the natural elasticity of the wire packing prevents any binding of the parts.

The objection to the use of wire packing lies in the fact that it never wears to fit the interior surface of the stuffing-box and consequently never becomes steam-tight there or at its circumference. Steam may not be able to creep along the rod, as the latter wears the packing to a bearing, but it will creep through to the back of the packing and along the surface of the box to the outside and escape to the atmosphere.

With the arrangement of wire and metal packing hereinbefore described the wire packing is used to its very best advantage for the reason that as soon as the steam gets by or past one coil of wire packing it meets a metal ring crushed steam-tight against the interior surface of the box, and must creep down to the rod again to get to the next coil. I also get the very best kind of packing—a series of metal rings pressed against the rod lightly and yieldingly, and the whole being arranged to permit of lateral adjustment and adapted to have any amount of wear followed up by the gland in the usual manner.

Having thus described my invention, what I claim as new, and desire to secure by Letters Patent, is—

1. A packing for piston and valve rods, consisting of a series of soft, antifriction metal rings having a continuous groove formed in each side thereof and formed with broad bearing-surfaces, and a suitable packing interposed between said rings, whereby endwise pressure may force said last-named packing into said grooves, substantially as described.

2. A packing for piston and valve rods, consisting of a series of soft, antifriction metal rings of cruciform section, and suitable packing interposed between said rings, whereby endwise pressure will crush said rings, substantially as described.

3. A packing for piston and valve rods, consisting of a series of soft, antifriction metal rings of cruciform section, and braided-wire coils arranged between said rings, and at each end of the series of rings, substantially as described.

4. The combination with the stuffing-box of a steam-engine, of an auxiliary packing-box arranged within the main box, a series of soft, antifriction metal rings of cruciform section, a series of braided-wire packing-coils arranged between said rings and a gland adapted to follow said packing, substantially as described.

In testimony whereof I affix my signature in presence of two witnesses.

EDWIN J. ARMSTRONG.

Witnesses:
J. F. BEALE,
H. M. STERLING.